(12) United States Patent
Hertoghs et al.

(10) Patent No.: US 7,515,542 B2
(45) Date of Patent: Apr. 7, 2009

(54) BROADBAND ACCESS NOTE WITH A VIRTUAL MAINTENANCE END POINT

(75) Inventors: Yves Hertoghs, Schilde (BE); Ali Sajassi, San Ramon, CA (US); Norman W. Finn, Livermore, CA (US); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 536 days.

(21) Appl. No.: 11/180,003

(22) Filed: Jul. 12, 2005

(65) Prior Publication Data

US 2007/0025256 A1    Feb. 1, 2007

(51) Int. Cl.
   *H04J 1/16* (2006.01)
(52) U.S. Cl. ............ 370/236.2; 370/249; 370/401
(58) Field of Classification Search ............ 370/249, 370/242, 395.53, 390, 401, 397, 399, 395.3, 370/232, 236.2, 493
   See application file for complete search history.

(56) References Cited

U.S. PATENT DOCUMENTS

| | | | |
|---|---|---|---|
| 5,848,277 | A | 12/1998 | Javernick et al. |
| 6,055,364 | A | 4/2000 | Speakman et al. |
| 6,073,176 | A | 6/2000 | Baindur et al. |
| 6,078,590 | A | 6/2000 | Farinacci et al. |
| 6,188,694 | B1 | 2/2001 | Fine et al. |
| 6,304,575 | B1 | 10/2001 | Carroll et al. |
| 6,373,838 | B1 | 4/2002 | Law et al. |
| 6,424,657 | B1 | 7/2002 | Voit et al. |
| 6,430,621 | B1 | 8/2002 | Srikanth et al. |
| 6,484,209 | B1 | 11/2002 | Momirov |
| 6,519,231 | B1 | 2/2003 | Ding et al. |
| 6,611,869 | B1 | 8/2003 | Eschelbeck et al. |
| 6,665,273 | B1 | 12/2003 | Goguen et al. |
| 6,668,282 | B1 | 12/2003 | Booth, III et al. |
| 6,693,878 | B1 | 2/2004 | Daruwalla et al. |
| 6,732,189 | B1 | 5/2004 | Novaes |

(Continued)

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

*Primary Examiner*—Chi H Pham
*Assistant Examiner*—Alexander Boakye
(74) *Attorney, Agent, or Firm*—The Law Offices of Bradley J. Bereznak

(57) ABSTRACT

A broadband access node includes a port for connection with a Digital Subscriber Line and a processor to run code that implements a virtual maintenance end point (vMEP). The vMEP translates an IEEE 802.1ag Loopback Message (LBM) received from a device on an Ethernet access network into a legacy operations and maintenance (OAM) message that is transmitted to a residential gateway (RG) device. The legacy OAM message determines a link-level connectivity status between broadband access node and the RG device. The vMEP also transmits a reply message back to the device on an Ethernet access network in compliance with the IEEE 802.1ag specification. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

16 Claims, 4 Drawing Sheets

U.S. PATENT DOCUMENTS

| | | |
|---|---|---|
| 6,757,286 B1 | 6/2004 | Stone |
| 6,763,469 B1 | 7/2004 | Daniely |
| 6,785,265 B2 | 8/2004 | White et al. |
| 6,789,121 B2 | 9/2004 | Lamberton et al. |
| 6,798,775 B1 | 9/2004 | Bordonaro |
| 6,826,698 B1 | 11/2004 | Minkin et al. |
| 6,829,252 B1 | 12/2004 | Lewin et al. |
| 6,839,348 B2 | 1/2005 | Tang et al. |
| 6,852,542 B2 | 2/2005 | Mandel et al. |
| 6,892,309 B2 | 5/2005 | Richmond et al. |
| 6,954,436 B1 | 10/2005 | Yip |
| 7,009,983 B2 | 3/2006 | Mancour |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,310,342 B2 * | 12/2007 | Rouleau ............. 370/397 |
| 7,345,991 B1 | 3/2008 | Shabtay et al. |
| 2002/0196795 A1 | 12/2002 | Higashiyama |
| 2003/0036375 A1 | 2/2003 | Chen et al. |
| 2003/0110268 A1 | 6/2003 | Kermarec et al. |
| 2003/0112781 A1 | 6/2003 | Kermode et al. |
| 2003/0142674 A1 | 7/2003 | Liam |
| 2003/0177221 A1 | 9/2003 | Ould-Brahim et al. |
| 2004/0095940 A1 | 5/2004 | Yuan et al. |
| 2004/0125809 A1 | 7/2004 | Jeng |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0233891 A1 | 11/2004 | Regan |
| 2004/0264364 A1 | 12/2004 | Sato |
| 2005/0007951 A1 | 1/2005 | Lapuh et al. |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0152370 A1 | 7/2005 | Meehan et al. |
| 2005/0163049 A1 | 7/2005 | Yazaki et al. |
| 2005/0249124 A1 * | 11/2005 | Elie-Dit-Cosaque et al. ..... 370/242 |
| 2006/0092847 A1 | 5/2006 | Mohan et al. |
| 2006/0098607 A1 | 5/2006 | Zeng |
| 2006/0182037 A1 | 8/2006 | Chen et al. |
| 2006/0285501 A1 | 12/2006 | Damm |

* cited by examiner

BROADBAND ACCESS NOTE WITH A VIRTUAL MAINTENANCE END POINT

RELATED APPLICATIONS

The present application is related to concurrently filed application Ser. No. 11/179,993, entitled, "Address Resolution Mechanism For Ethernet Maintenance Endpoints", which is assigned to the assignee of the present application.

FIELD OF THE INVENTION

The present invention relates generally to data communications systems; more specifically, to service provider (SP) networks with Ethernet access domains that support Operations and Management (OAM) functions.

BACKGROUND OF THE INVENTION

Digital Subscriber Line (DSL) technology is widely-used today for increasing the bandwidth of digital data transmissions over the existing telephone network infrastructure. In a typical system configuration, a plurality of DSL subscribers are connected to a service provider (SP) network through a Digital Subscriber Line Access Multiplexer (DSLAM), which concentrates and multiplexes signals at the telephone service provider location to the broader wide area network (WAN). Basically, a DSLAM takes connections from many customers or subscribers and aggregates them onto a single, high-capacity connection. The DSLAM may also provide additional functions such as Internet Protocol (IP) address assignment for the subscribers, IP Access Control Lists (ACLs), etc.

Asynchronous Transfer Mode (ATM) protocol networks have traditionally been utilized for communications between DSLAM devices and Broadband Remote Access Servers (BRAS) that provide authentication and subscriber management functions. A BRAS is a device that terminates remote users at the corporate network or Internet users at the Internet service provider (ISP) network, and commonly provides firewall, authentication, and routing services for remote users. Next generation BRAS devices are frequently referred to as Broadband Network Gateway (BBNG) devices. The ATM protocol is an international standard in which multiple service types (such as voice, video, or data) are conveyed in fixed-length "cells" over point-to-point network connections. Data packet cells travel through the ATM switches from the user network interface (UNI) to the network node interface (NNI) through a process called Virtual Path Identifier/Virtual Channel Identifier (VPI/VCI) translation. The VPI/VCI identifiers are used by the ATM switches to switch/direct the subscriber traffic to a given feature server, and in the reverse direction to forward server traffic to a given DSLAM/subscriber, without ambiguity. Furthermore, the VPI/VCI mechanism is used by the feature server to identify the subscriber.

U.S. Pat. No. 6,801,533, for example, teaches a system and method for proxy signaling in a DSLAM and generally describes a DSL network that includes communication transfer of signals from a DSLAM to a remote access server over a high-speed ATM network. Transmission of packet data over an ATM network is also taught in U.S. Pat. No. 6,785,232. U.S. Pat. No. 5,818,842 teaches a communication system with an interface device that connects a plurality of interconnected ATM switches to Local Area Network (LAN) interface adapters for connection to LAN networks.

Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (i.e., "bridges") to implement an Ethernet "cloud" or "island" that provides connectivity to the attached devices. The switch functions as an intelligent data traffic forwarder in which data packet frames are sent to ports where the destination device is attached. Examples of network switches for use in Ethernet network environments are found in U.S. Pat. Nos. 6,850,542, 6,813,268 and 6,850,521.

The use of Ethernet as a metropolitan and WAN technology has driven the need for a new set of OAM protocols. Two main areas that have been the subject of recent attention are Service OAM and Link OAM protocols. Service OAM provides monitoring and troubleshooting of end-to-end Ethernet service instances, while Link OAM allows a service provider to monitor and troubleshoot an individual Ethernet link. Much of the work on Service OAM protocols is found in the IEEE 802.1ag specification, which specifies protocols and procedures to support connectivity fault management (CFM) used for discovery and verification of the path, through bridges and LANs, taken for data frames to and from specified network users. The 802.1ag standard basically allows service providers to manage each customer service instance, or Ethernet Virtual Connection (EVC), individually. Since Service OAM typically operates on a per-EVC basis irrespective of the underlying transport mechanism, 802.1ag essentially enables the SP to determine if an EVC has failed.

Ethernet CFM, as defined in 802.1ag, relies on a functional model consisting of hierarchical maintenance or administrative domains that are defined by provisioning which switch/router ports are interior to the particular domain. In addition, maintenance end points (MEPs) are designated on the edge nodes of a domain (each EVC), and maintenance intermediate points (MIPs) are designated on relevant interior ports. FIG. 1 is an example of an Ethernet OAM network topology that illustrates a hierarchy of domains that includes customer, provider, operator, and Multi-protocol Label Switching (MPLS) domains, which correspond to Levels 0, 3, 5, and 7 in the proposed IEEE 802.1ag specification. In CFM terminology, levels define the access control structure for domain information and state, with higher numbers (toward the physical level) being bounded by lower numbers (toward the service level). As can be seen, the SP network includes an IP/MPLS core connected with a pair of Ethernet access domains via network-facing provider edge (n-PE) devices. Each access domain has a user-facing provider edge (u-PE) device providing a link with a customer edge (CE) device, which is commonly referred to as a residential gateway (RG) device. The MEPs for each domain are illustrated by a cross-hatched box under the corresponding network device, with the MIPs being shown as open boxes in the connection path.

One of the drawbacks of Ethernet CFM as defined in 802.1ag is that it presumes that every node in the network (CE-to-CE in FIG. 1) supports the full set of functionalities defined in that specification. One of these presumptions, for instance, is that every node has a MAC address. The problem, however, is that for broadband access the service terminating node at the customer premises equipment (CPE) typically does not have a MAC address or the ability to run the full protocol suite defined in the 802.1ag standard. In many cases, the first-mile connection to the customer demarcation operates in accordance with a legacy link OAM scheme such as ATM OAM, or in compliance with the IEEE 802.3 (Clause 57) standard (formerly known as 802.3ah), which do not fully support 802.1ag functionality. In other words, the ATM-only architecture of the past has evolved to the point where the DSLAM is now typically connected via ATM to the CPE and via Ethernet to the BBNG. This makes it very difficult, if not impossible, for a SP network administrator or operator to check the physical connection path that data packets take between the RG and the BBNG nodes in response to, say, a service complaint received from a subscriber with an ATM connection to a DSLAM device.

Therefore, what is a needed is a method and apparatus for performing connectivity checks from the provider or operator level to the customer domain level in networks where the CPE nodes do not operate in compliance with 802.1ag.

By way of further background, U.S. Patent Publication No. 2005/0099951 teaches a method of detecting a fault on an Ethernet network using OAM connectivity check functions in which connectivity check frames are generated and sent to either a specific unicast destination address or a multicast destination address. United Patent Publication No. 2005/0099949 describes a further method that defines OAM domains by defining reference points on the Ethernet network, and using the reference points to insert and extract Ethernet OAM frames. A system for interworking between a broadband system such as an ATM system and a GR-303 format system for telecommunication calls is disclosed in U.S. Pat. No. 6,667,982.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A mechanism that allows interworking between legacy broadband access link level OAM schemes and IEEE 802.1ag Ethernet connectivity fault management is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols.

In this context, a protocol consists of a set of rules defining how the nodes interact with each other.

Figure 4:
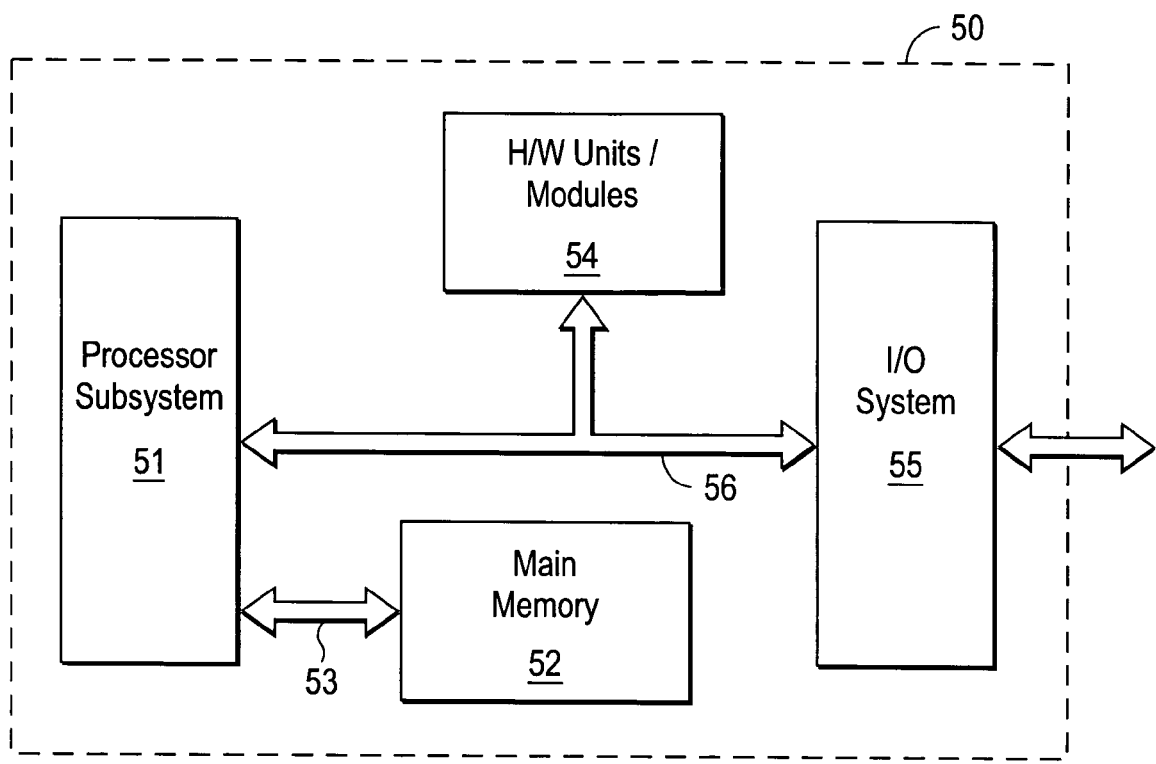
FIG. 4 is a generalized circuit schematic block diagram of a network node.

As shown in FIG. 4, each node 50 typically comprises a number of basic subsystems including a processor subsystem 51, a main memory 52 and an input/output (I/O) subsystem 55. Data is transferred between main memory ("system memory") 52 and processor subsystem 51 over a memory bus 53, and between the processor and I/O subsystems over a system bus 56. Examples of the system bus may include the conventional lightning data transport (or hyper transport) bus and the conventional peripheral component [computer] interconnect (PCI) bus. Node 50 may also comprise other hardware units/modules 54 coupled to system bus 56 for performing additional functions. Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

In one aspect, the present invention provides a so-called "virtual Maintenance Endpoint (vMEP)" which emulates a MEP, as defined in the IEEE 802.1ag specification, on a broadband access node. Through the use of vMEPs, a broadband access node may check the integrity of the subscriber line by issuing a legacy OAM loopback message (e.g., ATM or 802.3ah loopback), and then signal the response state within the Ethernet access network using 802.1ag continuity check messages (CCMs). This allows for both reactive monitoring (where the operator polls the port status of an access node) and proactive monitoring (where the access node signals the "health" of the access line using standard CFM messages). It also permits seamless interworking between 802.1ag CFM and legacy link level OAM schemes commonly used between the CPE and broadband access nodes.

Figure 1:
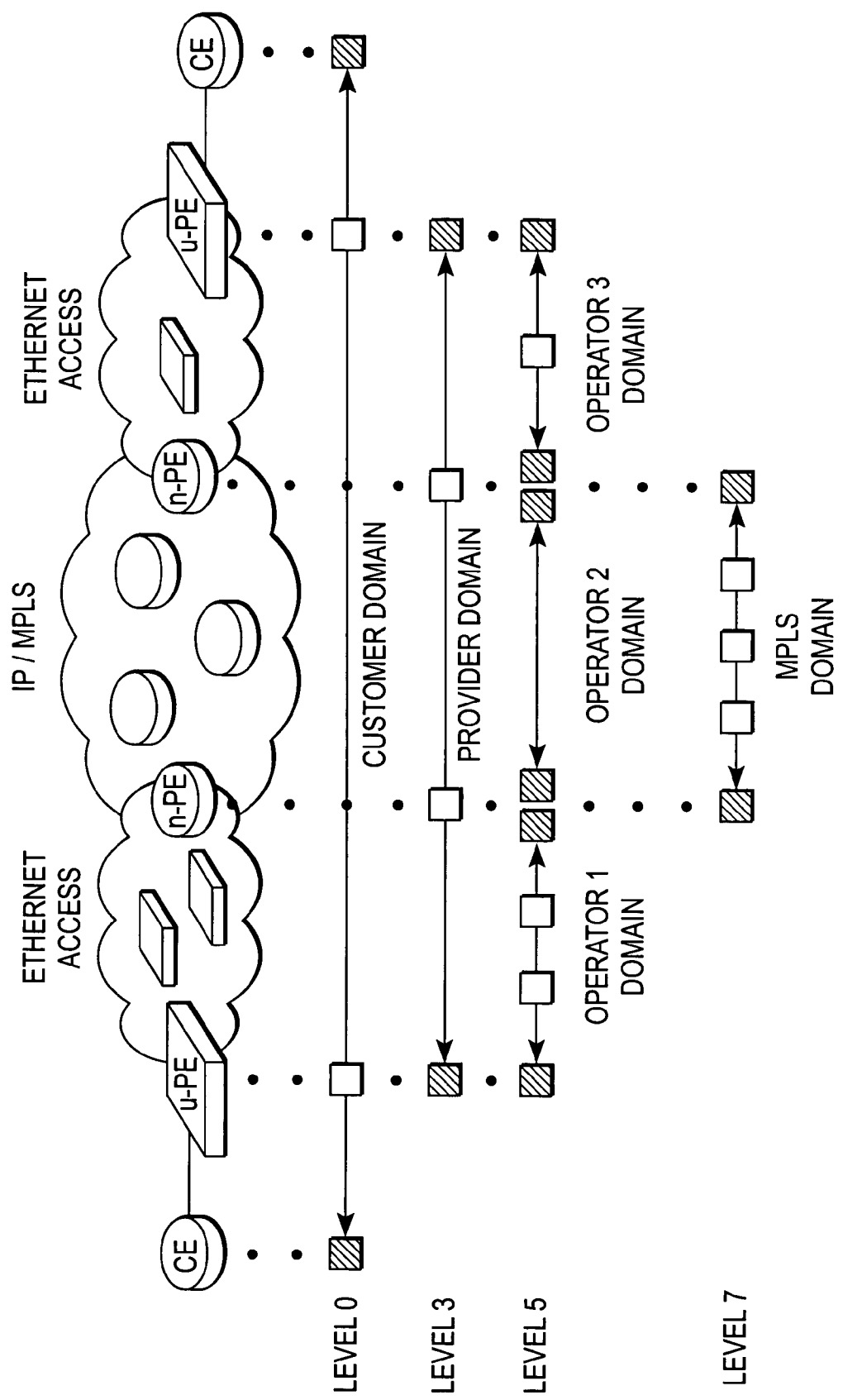
FIG. 1 is a diagram showing various OAM domains for a standard network topology.
Figure 2:
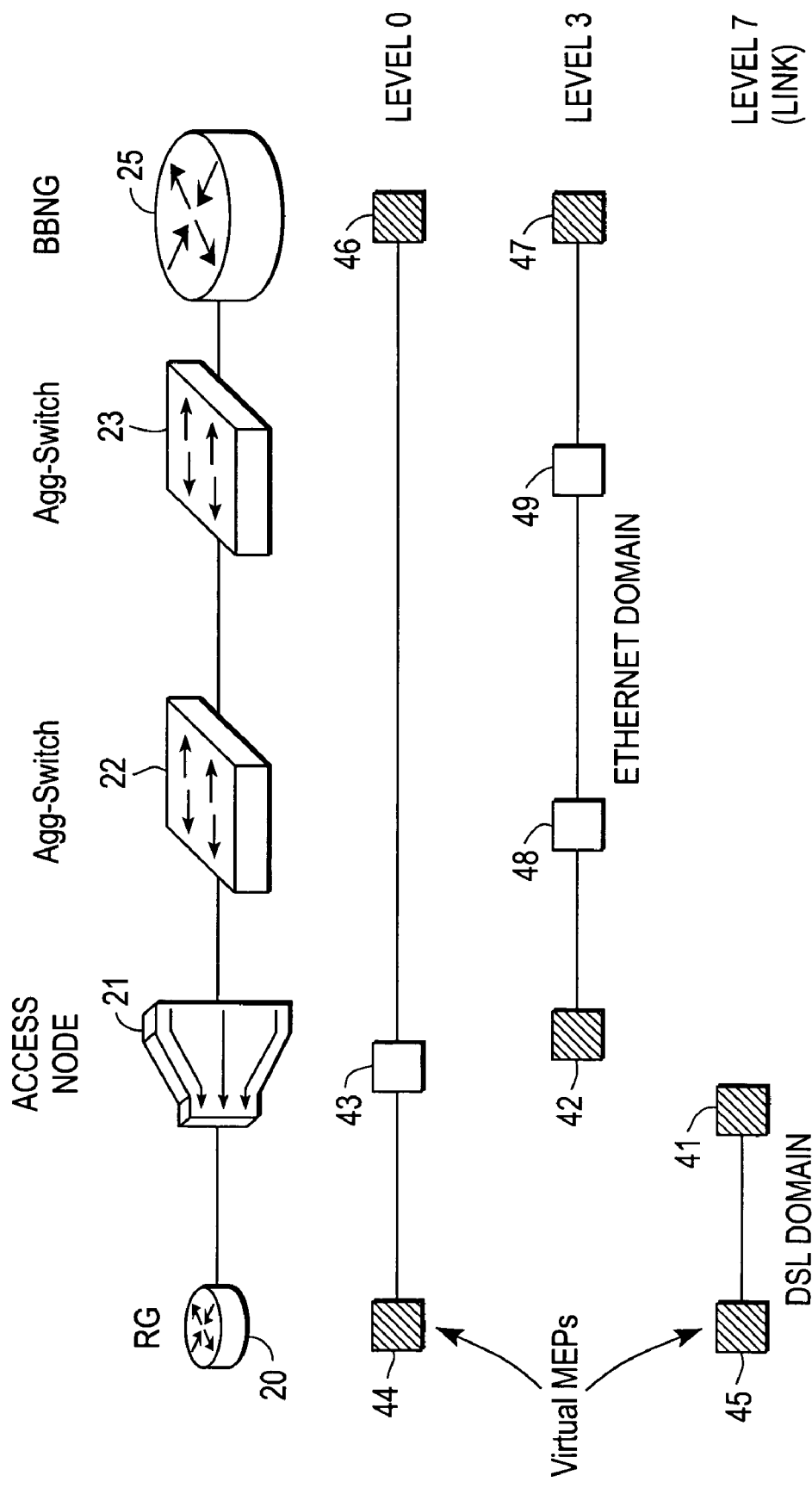
FIG. 2 is a conceptual model of a network with virtual MEPs in accordance with one embodiment of the present invention.

FIG. 2 is a conceptual diagram showing a broadband access/aggregation network with vMEPs in accordance with one embodiment of the present invention. The diagram of FIG. 2 illustrates an Ethernet access network that includes a BBNG device 25 (e.g., a router) that terminates bridged sessions, e.g., point-to-point over Ethernet (PPPoE) or Internet protocol over Ethernet (IPoE). BBNG device 25 is connected with a broadband access node 21 through bridges or switches 22 & 23, which are frequently referred to as aggregation (Agg) devices. (In the context of the present application, the terms "bridge" and "switch" are considered synonymous.) Access node 21 is basically a user-facing provider edge (u-PE) device, which, in this example, comprises an Ethernet DSLAM that has a subscriber-facing UNI port connected with a RG device 20.

In FIG. 2, BBNG 25 is shown with a MEP 46 at Level 0 and a MEP 47 at Level 3. At the other end, access node 21 is shown with a DSL port having a MEP 42 at Level 3 (Ethernet or provider domain), a MIP 43 at Level 0, and a MEP 41 at link Level 7 (DSL domain). At Level 3, MIPs run on aggregation switches 22 & 23. Thus, access node 21 has an inward MEP, a MIP, and an output MEP stacked together. It is appreciated that each of these MEPs resides on physical ports of the respective devices. As practitioners in the arts will further understand, the inward MEP is defined as the one which is responding to messages originating from the other side of the relay function, whereas the outward MEP is the one which is responding to messages originating at the same side of the MAC relay function. The interior facing function (IFF) of the MEP faces the bridging component and functions to send continuity check messages (CCMs), maintain a line status database, and also send, and reply to, loopback ("ping") messages and trace route messages.

Each MEP also has an exterior facing function (EFF) that sends signals in the opposite direction of the MEP, e.g., for an alarm indication signal (AIS) that provides notification to other elements that there is a fault in the Ethernet network. Each MEP also has a virtual interior facing function (VIFF) that maintains a database by relying on the physical level or link level OAM (e.g., MPLS OAM, ATM OAM, 802.3ah OAM, etc.) For instance, MEP 41 on access port 21 receives line status signals at Level 7 through its VIFF. The EFF on MEP 41 at Level 7 can send an alarm indication signal (AIS) that will bubble up to Level 0 to reach BBNG 25.

The network diagram of FIG. 2 also includes vMEPs 44 & 45 at Levels 0 & 7, respectively. Virtual MEPs 44 & 45 are shown logically on RG 20, but in actuality, vMEPs 44 & 45 comprise a software construct that runs on one or more processors of access node 21. (The vMEPs may alternatively comprise hardware resident on the access node.) In other words, the vMEPs at each Level are implemented as software (or firmware) code that is executed by a processor of the DSLAM. The function of the vMEP is to emulate a MEP on the broadband access node so as to allow interworking between legacy broadband access link level OAM schemes and 802.1ag signals that are commonly sent across the Ethernet access domain network.

Figure 3:
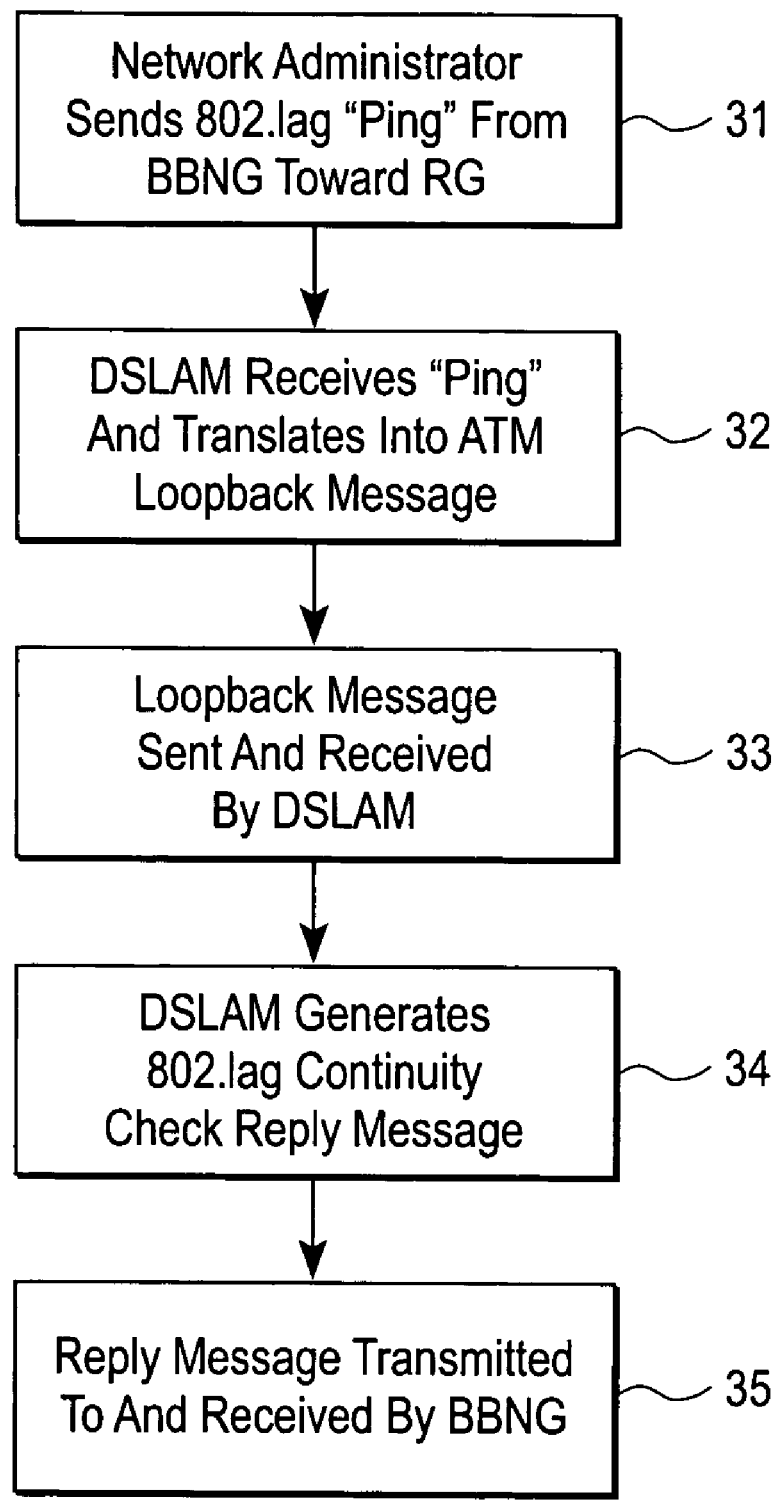
FIG. 3 is a flow chart diagram showing a method of operation in accordance with one embodiment of the present invention.

FIG. 3 is a flow chart diagram that illustrates an example network operation in accordance with one embodiment of the present invention in which a network administrator verifies connectivity in response to a complaint from a subscriber. The verification process begins with the transmission of an 802.1ag loopback message (LBM) by a MEP on the BBNG of the Ethernet access domain at the request of the network administrator (block 31). The purpose of the loopback message is to determine whether the target maintenance end point is reachable or not, similar in concept to an Internet Control Message Protocol (ICMP) echo or "ping" message. When the loopback message is received at the other end of the access network, the vMEP running on the DSLAM translates the loopback message into the appropriate link level OAM (e.g., ATM or Clause 57 Ethernet) message for checking connectivity of the customer link between the DSLAM and RG. In this example, the 802.1ag loopback message is translated into an ATM loopback message (block 32). In other configurations, the 802.1ag loopback message may be translated into an 802.3ah loopback message, or another type of connectivity check message that checks the real, physical connection path between the RG and access node.

After the DSLAM sends out and receives the ATM loopback message response back from the RG (block 33), thereby confirming connectivity with the subscriber at the link level, the vMEP on the DSLAM generates an 802.1ag loopback reply (LBR) message (block 34) that is transmitted back to the BBNG (block 35). Note that from the standpoint of the BBNG, the translation process that occurs at the DSLAM is completely transparent. Thus, through the use of virtual MEPs the BBNG router can send a connectivity check message at the Ethernet domain Level which results in a remote ATM loopback (via the VIFF function) on the DSL line. In the example of FIG. 2, Outward facing MEP 41 of access node 21 "receives" the loopback message from vMEP 45 at the same Level. MIP 43 is defined to allow higher domain level message "translation" between inward and outward MEPs 42 & 41, such that the inward MEP 42 can send a connectivity status message reply back to MEP 47 of BBNG 25.

It is appreciated that in the reactive case described above, both the LBM and LBR messages are unicast messages, destined to the vMEP and BBNG MAC addresses, respectively.

In another aspect of the present invention, instead of reactive monitoring of the line between the subscriber and the DSLAM, the vMEPs on the access node may proactively issue periodic "heart-beat" messages that allow the vMEPs to continuously check the "health" of the link level connection to the RG. In other words, the access node operates to continuously monitor the link level connectivity with the RG, basically emulating the MEP on the RG. The vMEP on the access node may also operate to send out 802.1ag CCM multicast messages which are received by the BBNG MEP. The BBNG uses these CCMs to determine the continuity towards the RG.

Alternatively, in certain implementations or network configurations, the CCM functionality provided by the vMEPs may be disabled.

It should be understood that elements of the present invention may be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method of operation for a broadband access node of an Ethernet network, the method comprising:

receiving a loopback message (LBM) transmitted by a maintenance endpoint (MEP) of a Broadband Network Gateway (BBNG) device on the Ethernet network in compliance with the IEEE 802.1ag specification;

translating the LBM into a link-level operations and maintenance (OAM) loopback message appropriate for checking link-level connectivity status of a Digital Subscriber Line (DSL) link between the broadband access node and a residential gateway (RG) device, the OAM loopback message being non-compliant with the IEEE 802.1ag specification;

determining the link-level connectivity status of the DSL link by:

(a) sending the OAM loopback message to the RG device across the physical link;
(b) receiving the OAM loopback message back at the broadband access node to confirm link-level connectivity between the RG and the broadband access node; or
(c) failing to receive the OAM loopback message back at the broadband access node as a result of a connectivity fault;
generating a loopback reply (LBR) message indicative of the link-level connectivity status of the DSL link between the RG and the broadband access node, the LBR message being in compliance with the IEEE 802.1ag specification; and
transmitting the LBR message to the BBNG.

2. The method of claim 1 wherein the broadband access node comprises a Digital Subscriber Line Access Multiplexer (DSLAM).

3. The method of claim 1 wherein the OAM loopback message comprises an Asynchronous Transfer Mode (ATM) OAM message.

4. The method of claim 1 wherein the OAM loopback message comprises an IEEE 802.3ah compliant OAM message.

5. A method of operation for a broadband access node of an Ethernet access network, comprising:
periodically sending, by a virtual maintenance end point (vMEP) of the broadband access node, a loopback message to residential gateway (RG) device linked to the access node, the loopback message for monitoring link-level connectivity between the RG and the broadband access node, the loopback message being in compliance with a first operations and maintenance (OAM) specification incompatible with a IEEE 802.1ag specification;
generating a connectivity check message (CCM) indicative of the link-level connectivity between the RG and the broadband access node as determined by the first message, the CCM being in compliance with the IEEE 802.1ag specification; and
transmitting, by the vMEP of the broadband access node, the CCM to a Broadband Network Gateway (BBNG) device on the Ethernet access network.

6. The method of claim 5 wherein the first OAM specification complies with an Asynchronous Transfer Mode (ATM) OAM specification.

7. A user-facing provider edge (u-PE) device for association with an Ethernet access network, the u-PE device comprising:
a port for connection with a Digital Subscriber Line; and
a processor to run code that implements a virtual maintenance end point (vMEP) operable to translate a loopback message (LBM) into an operations and maintenance (OAM) loopback message, the OAM loopback message being transmitted to a residential gateway (RG) device to determine a link-level connectivity status between the u-PE device and the RG device, the vMEP being further operable to transmit a unicast message on the Ethernet access network, the LBM and the unicast message being in compliance with the IEEE 802.1ag specification.

8. The u-PE device of claim 7 wherein the u-PE device comprises a Digital Subscriber Line Access Multiplexer (DSLAM).

9. The u-PE device of claim 7 wherein the multicast message is transmitted to a MEP of a Broadband Network Gateway (BBNG) device connected to the Ethernet access network.

10. A broadband access node for connecting a residential gateway (RG) device to an Ethernet access network, the broadband access node comprising:
a port for connection with the RG device via a physical link; and
means for implementing a virtual maintenance end point (vMEP) operable to send a loopback message from the port to the RG device to determine a link-level connectivity status of the physical link between the RG device and the broadband access node, the loopback message being compliant with a standard other than the IEEE 802.1ag specification, the vMEP being further operable to send an IEEE 802.1ag-compliant message to a Broadband Network Gateway (BBNG) device on the Ethernet access network indicative of the link-level connectivity status of the physical link.

11. A Digital Subscriber Line Access Multiplexer (DSLAM) device for connection to an Ethernet access network, comprising:
a port for connection to a RG device via a physical link;
a processor that runs code which implements a virtual maintenance end point (vMEP) operable to sends a loopback message from the port to the RG device to determine a link-level connectivity status of the physical link, the loopback message being compliant with an operations and maintenance (OAM) specification that is non-IEEE 802.1ag compliant, the vMEP being further operable to send a IEEE 802.1ag-compliant message to a Broadband Network Gateway (BBNG) device on the Ethernet access network indicative of the link-level connectivity status of the physical link.

12. The DSLAM device of claim 11 wherein the OAM specification comprises an Asynchronous Transfer Mode (ATM) OAM specification.

13. The DSLAM device of claim 11 wherein the OAM specification comprises an IEEE 802.3ah or IEEE 802.3 Clause 57 specification.

14. A computer-readable memory encoded with a computer program operable to:
send a loopback message from a broadband access node to a residential gateway (RG) device via a physical link, the loopback message for determining a link-level service connectivity status of the physical link between the RG and the broadband access node, the loopback message being in compliance with an Asynchronous Transfer Mode (ATM) operations and maintenance (OAM) specification;
generate a connectivity check message (CCM) compliant with an Ethernet connectivity fault management (CFM) standard, the CCM indicating the link-level service connectivity status of the physical link between the RG and the broadband access node; and
transmit the CCM from the broadband access node, to a Broadband Network Gateway (BBNG) device connected to an Ethernet access network.

15. The computer-readable memory of claim 14 wherein the ATM OAM specification comprises an IEEE 802.3ah or IEEE 802.3 Clause 57 specification.

16. The computer-readable memory of claim 14 wherein the CFM standard comprises an IEEE 802.1ag-compliant specification.

* * * * *